C. B. GILLESPIE.
CONTINUOUS FILM KINETOSCOPE.
APPLICATION FILED FEB. 2, 1909.
928,443.
Patented July 20, 1909.
2 SHEETS—SHEET 1.
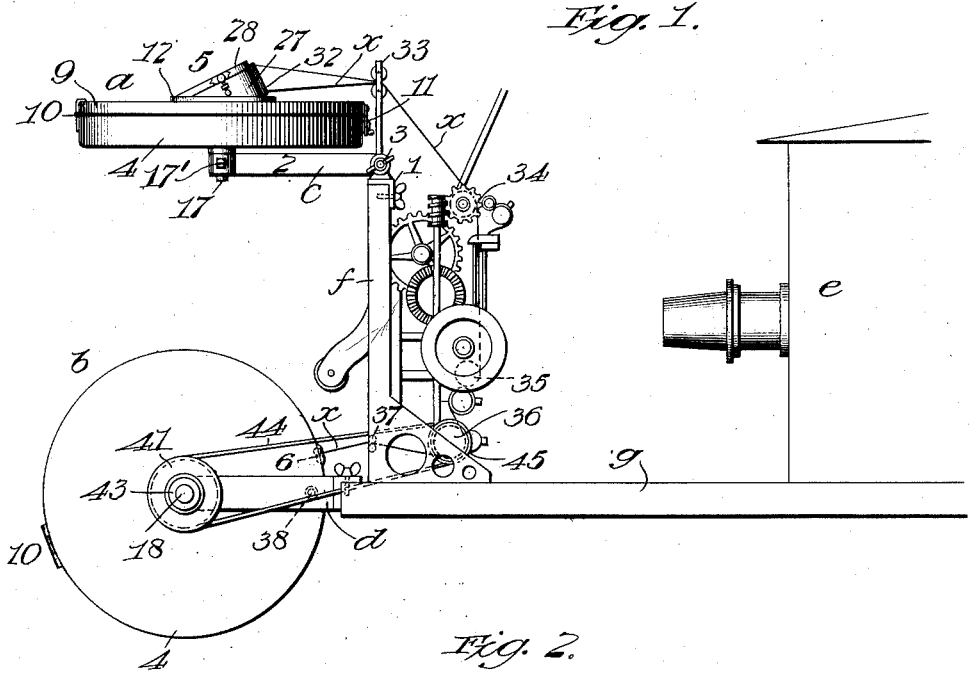
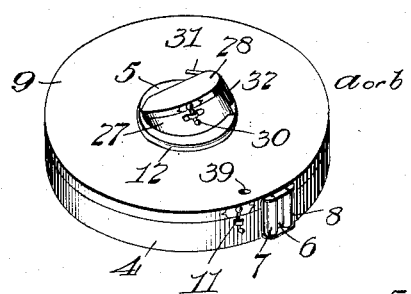
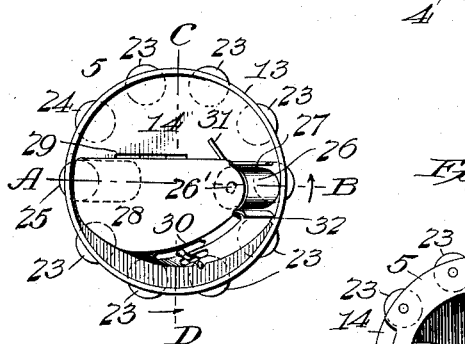
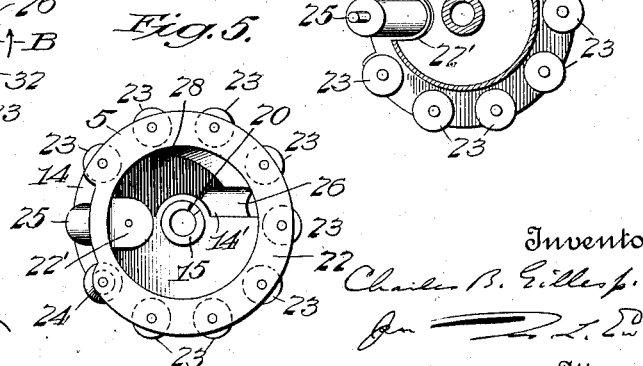
Witnesses
Inventor
Charles B. Gillespie
Attorney

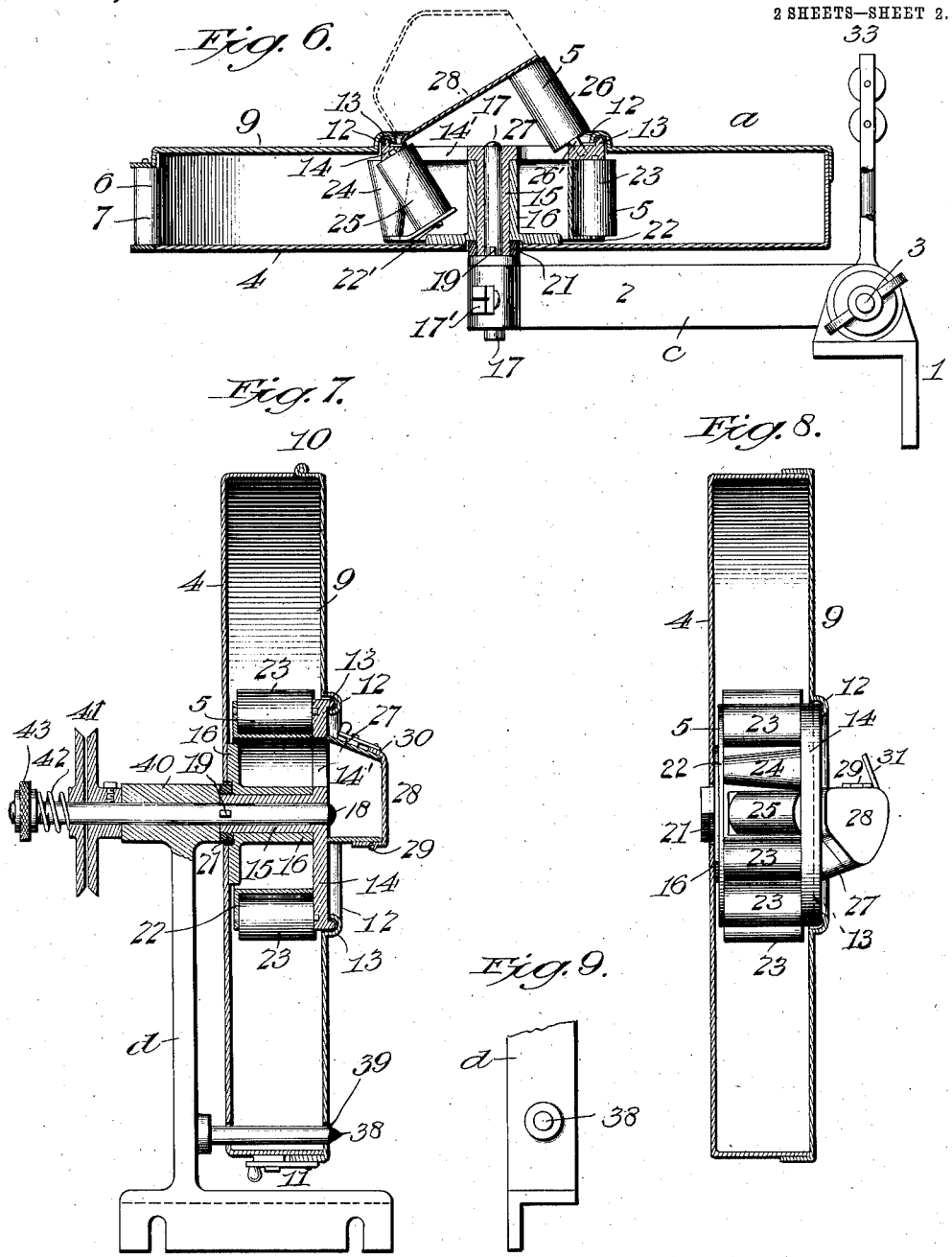

UNITED STATES PATENT OFFICE.

CHARLES B. GILLESPIE, OF RIDGEVILLE CORNERS, OHIO.

CONTINUOUS-FILM KINETOSCOPE.

No. 928,443.　　　Specification of Letters Patent.　　Patented July 20, 1909.

Application filed February 2, 1909. Serial No. 475,652.

*To all whom it may concern:*

Be it known that I, CHARLES B. GILLESPIE, a citizen of the United States of America, and a resident of Ridgeville Corners, Henry county, in the State of Ohio, have invented a new and useful Improvement in Continuous-Film Kinetoscopes, of which the following is a specification.

This invention relates to the feed and take-up reels of those kinetoscopes or moving-picture machines in which a continuous film is fed from one reel to another in the operation of the machine; and it relates more particularly to means by which the film may be drawn from the interior or middle convolution of the film roll in the feed reel, and means by which rewinding such films is rendered unnecessary.

The leading object of the present invention is to so construct a film reel for such apparatus that one and the same reel may be employed first as a feed reel and then as a take-up reel, and so on alternately without rewinding the film.

Another object is to so construct the improved reel that the film at all times, excepting at most a few feet thereof, is inclosed in a fire-proof magazine, transferable with the reel proper and film, whereby the danger and delay incident to removing the reel from one magazine and inserting it in another are avoided.

Other objects will be set forth in the general description which follows.

The invention consists in certain novel combinations of parts, and in a continuous-film kinetoscope or moving-picture machine embodying such combinations or any of them, as hereinafter described and claimed.

Two sheets of drawings accompany this specification as parts thereof.

Figure 1 is a side view representing the general combination of parts; Fig. 2 is a perspective view of a combined film reel and magazine detached; Fig. 3 is a face view on a larger scale of the central part or hub of the reel detached; Fig. 4 is a corresponding view of said hub with its face plate broken away; Fig. 5 is a back view of the same; Fig. 6 is a sectional side view of the reel and its supporting bracket in its feed-reel position, on the same scale as Figs. 3–5, the hub being shown in section on the line A—B Fig. 3; Fig. 7 is a like view of the reel and its take-up bracket in its take-up reel position, with the hub in section on the line C—D Fig. 3; Fig. 8 represents a sectional edge view of the combined film reel and magazine detached, showing an edge view of its hub on the same scale as Figs. 3–7; and Fig. 9 is a fragmentary view of a portion of the take-up bracket projected from Fig. 7.

Like reference characters refer to like parts in all the figures.

Apart from a pair of combined film reels and magazines, $a$ and $b$, a feed-reel bracket, $c$, and a single feature of the take-up reel bracket, $d$, of novel construction, as hereinafter described, the remainder of the general combination of parts represented by Fig. 1 may all be of known or improved construction, the details of which form no part of the present invention.

In common with the apparatus described and claimed in my previous specification forming part of an application for patent filed June 17, 1908, and allowed December 1, 1908, Serial No. 444089, said general combination of parts, Fig. 1, includes a picture projecting lantern, $e$, and a feed mechanism, $f$, which may be of any known or improved forms to which the improved parts of the present apparatus are or may be applicable, including those of machines now in use; and a frame, $g$, common to said lantern and feed mechanism, and which can be tilted to support said lantern and feed mechanism at any required angle; and said feed-reel bracket, $c$, is constructed with sections, 1 and 2, connected with each other by a clamp hinge, 3, so as to having a transverse horizontal axis, so as to provide for keeping the axis of the feed-reel ($a$) vertical when said frame $g$ is tilted; each of said combined film reels and magazines $a$ and $b$ is moreover constructed with a pan-shaped main part, 4, and a hub part, 5, which in the feed-reel position ($a$) operate on the same general principle as those of the feed reel described and claimed in said previous specification. To that extent the present improvement is additional to that of said previous specification. In the present improved construction, said main reel part 4 constitutes a part of the reel magazine, its rim being provided with a film passage, 6, Fig. 2, etc., and with a pair of flame-trap rolls, 7 and 8, thereat. The other magazine member is a lid-shaped annular part, 9, Fig. 1, etc., connected with said main part 4 by a suitable hinge, 10, and a suitable fastening, 11, at diametrically opposite points, and constructed with a flame-guard, 12, around its inner circumference interacting with a flame-guard curb, 13, Figs. 3, 6, 7 and 8, on the face plate, 14, of said hub part 5. A hollow spindle, 15, projects rearward from said face plate 14 within the hub 5, and is fitted to the bore of another hub-part, 16, fixedly attached within said main reel part 4 at its center. Compare Figs. 4 to 7, inclusive. The construction is such that either of these parts 15 and 16 may turn freely with reference to the other. The bore of said spindle 15 is fitted in common to a vertical center pin, 17, at the extremity of said feed-reel bracket c, as in Fig. 6, and to the carrying end of the spindle, 18, of said take-up bracket d, Fig. 7; each of them being constructed with a lug, 19, to interact with a notch, 20, Fig. 5, in the free or rear end of the spindle 15. A nut, 21, Figs. 6–8, interacting with the screw-threaded extremity of said rear end of the spindle 15, and with the rear face of said hub part 16, which may be recessed to accommodate the nut, renders the reel parts 4 and 5 inseparably united with each other, as regards the operation of the apparatus, but so that the main part 4 may rotate freely around the hub part 5 in the feed-reel arrangement, Fig. 6; or the hub part 5 may rotate freely within said main part 4 in the take-up reel arrangement, Fig. 7. Said hub part 5 of each of the combined film reels and magazines a and b is further constructed with an annular piece, 22, L-shaped in cross section, rigidly attached to the back of said face plate 14, and which forms an end portion parallel with said face plate and provided in common therewith with bearings for trunnions on the ends of a series of rolls, 23 and 24, forming the peripheral contact surface of the hub 5, and consisting of a sufficient number of cylindrical rolls (23) and a tapered roll (24) having its large end in front or adjoining said face plate 14. A cylindrical delivery roll, 25, is supported at a suitable angle adjacent to said tapered roll 24 between a beveled surface of the face plate 14 and an oblique projection, 22', Figs. 4–6, adjoining a slot in said annular piece 22. A second delivery roll, 26, turns freely on a rigid spindle, 26', projecting obliquely outward from the face plate 14, parallel with the axis of said roll 25. An inclosure for said delivery rolls 25 and 26 and an inclosed clear path between them are formed by an opening, 14', in said face plate 14, a curb, 27, attached externally thereto, and a lid, 28, connected with said curb by a hinge, 29, and a fastening, 30. When this lid is unfastened and opened, as in dotted lines in Fig. 6, the film may be engaged edgewise with said delivery roll 26; and when said lid is closed and fastened, the required protection against fire is extended to the outer side of that roll.

A rigid hook, 31, Figs. 2, 3 and 8, attached to the delivery curb 27 adjacent to its outlet, 32, provides for fastening the end of the film temporarily by engaging one of its perforations with said hook. When a combined film reel and magazine (a) is supported on said feed-reel bracket c as at a in Fig. 1 and in Fig. 6, the interaction of the lug 19 on its center pin 17 with said notch 20 of the hub 5 renders the hub non-rotary, with its film outlet 32 directed toward the hinge 3 of the bracket, and the main reel part 4 with its lid 9 rotates freely in a horizontal plane around said hub 5, under the tension of the escaping film. The center pin 17 is rendered non-rotary and also adjustable vertically to raise or lower the feed reel by a set screw, 17', Figs. 1 and 6. To interact with the film, x, Fig. 1, as it is drawn from said outlet 32, the feed-reel bracket c is further provided with a film guide, 33, Figs. 1 and 6, composed of a pair of uprights rigidly attached to the hinge end of said member 2 of the bracket and a pair of rolls turning freely between the upper ends of said uprights. From said rolls of the film guide 33 the film, x, Fig. 1, passes to the customary series of toothed feed rolls, 34, 35 and 36, Fig. 1, of the feed mechanism f, and thence between a pair of guide rolls, 37, Fig. 1, to said guide rolls 7 and 8 at the inlet 6 of the combined film reel and magazine (b) in the feed-reel position in which it is shown at b in Fig. 1 and in Fig. 7. Compare Fig. 2. In said feed-reel position of the combined film-reel and magazine (b) said notch 20 of the hub 5, interacting with the lug 19 of the take-up spindle 18 as aforesaid, compels the hub to rotate steadily with said spindle in a vertical plane and to wind up the film thereon; the outer end of the film being fastened to the hub by said hook 31; while the main reel part 4 with its lid 9 is fastened by a stud pin, 38, Figs. 1, 7 and 9, on the take-up bracket d, interlocking with a socket, 39, Figs. 2 and 7, in said main reel part and lid or in the former parallel to the axis of the hub 5; said film inlet 6 being thus held in proper relation to said guide rolls 37 of the feed mechanism f as in Fig. 1. The other and known features of said take-up bracket d are a long horizontal bearing, 40, Fig. 7 for said spindle 18; a clutch pulley, 41, one member of which is fast on the spindle; a spring, 42, rendering the other member of the pulley spring-pressed, and a nut, 43, screwed on the outer end of the spindle to regulate the spring pressure; said pulley being driven by a band, 44, Fig. 1, from a driving pulley, 45, concentric with the lowermost toothed roll 36 of the feed mechanism f.

When the film is all in the magazine of the take-up reel (b), this reel and the empty feed reel and magazine (a) are made to exchange places, the end of the film (x) is disengaged from the hook 31 and threaded through the film guide 33, the feed mechanism f, the film passage 6 of what is then the feed reel and magazine (b), around the hub 5 of the latter to its tapered roll 24 and thence in contact with its delivery rolls 25 and 26 and through its film outlet 32 to its hook 31 preparatory to the succeeding operation. The hub lid 28 is thrown back, as in dotted lines in Fig. 6, during the threading of the film, and after drawing the film between the rolls 24 and 25 it is only necessary to insert it edgewise in the outlet 31 in contact with the roll 26.

The combined film reel and magazine (a) and the feed-reel bracket c may be substituted for the feed-reel, feed-reel magazine and feed-reel bracket described in said previous specification forming part of my application Serial No. 444089; or, in other words, the improved film-reel and magazine may be used exclusively in its feed-reel position (a) and the take-up reel may be of the construction and mode of operation set forth in said previous specification. In this case the lid 9 of the combined film-reel and magazine would be opened and the film transferred to the open topped main reel part 4 from the take-up reel as set forth in said previous specification. In a combined film reel and magazine intended to be so used the film passage 6 and trap rolls 7 and 8 would be omitted.

The number and construction of the rolls in the hub 5 of the combined film reel and magazine may be varied; the fastenings 11 and 30 and like details may be of any known or improved make; and other like modifications will suggest themselves to those skilled in the art.

Having thus described said improvement, I claim as my invention, and desire to patent under this specification:

1. A combined film reel and fireproof magazine for kinetoscopes, including a pan-shaped main reel part and a central hub within said main part, rotatable with reference to each other, said hub being constructed with a film outlet, and an annular lid surrounding said hub and interacting with said main part and hub.

2. A combined film reel and magazine for kinetoscopes adapted to be used alternately as a feed reel and as a take-up reel, the same including a pan-shaped main reel part and a central hub within said main part rotatable with reference to each other and an annular lid interacting with said main part and hub, and provided with film passages in a projecting portion of said hub and in the rim of said main part respectively and suitable flame traps at said film passages.

3. A combined film reel and magazine for kinetoscopes adapted to be used alternately as a feed reel and as a take-up reel, the same including a pan-shaped main reel part and a central hub within said main part rotatable with reference to each other and an annular lid interacting with said main part and hub, and provided with film passages in a projecting portion of said hub and in the rim of said main part respectively, flame traps at said film passages, and means for fastening the end of the film at the film passage of the hub.

4. The combination, in a combined film reel and magazine, of a pan-shaped main reel part, a hub part fast therein and having a central bore, a hub part including a spindle fitted to said bore and having a screw-threaded rear end, a nut interacting with the latter and with the back of the hub part first named, and an annular lid having a hinge and a fastening at opposite edges and interacting with said main part and with the spindle carrying hub part.

5. The combination, in a combined film reel and magazine, of a pan-shaped main reel part, a hub part fast therein and having a central bore, a hub part including a spindle fitted to said bore and a face plate constructed with an outwardly projecting marginal curb concentric therewith, and an annular lid attached to said main part and constructed with a flame guard embracing said curb.

6. The combination, in a continuous film kinetoscope, of a feed-reel bracket, an external film guide, a combined film reel and magazine having a pan-shaped main part rotatable in a horizontal plane, a non-rotary hub located centrally within said main part and provided with a peripheral series of rolls to contact with the film at its inner coil, including a tapered roll, an oblique delivery roll adjacent to said tapered roll and a projecting portion terminating in the film outlet and containing a free ended delivery roll at said outlet, and means for rendering the magazine flame tight including an annular lid attached to said main part and a lid rendering said projecting portion of the hub normally closed excepting the film outlet.

7. The combination, in a continuous film kinetoscope, of a take-up bracket, a combined film reel and magazine having a central hub rotatable in a vertical plane and provided with means for fastening the inner end of the film thereto, a concentric pan-shaped main part having a film inlet in its rim and means for rendering the magazine flame tight including an annular lid attached to said main part.

8. The combination, in a continuous film kinetoscope, of a combined film reel and magazine having a central hub rotatable in a vertical plane and provided with means for fastening the inner end of the film thereto, a non-rotary pan-shaped main part having a film inlet in its rim, and a socket parallel to the axis of said hub, an annular lid attached to said main part, having a horizontal spindle on which said hub is mounted and a stud-pin parallel with said spindle to interlock with said socket.

9. The combination with the feed mechanism, in a continuous film kinetoscope, of a feed reel bracket having a vertical center pin and a film guide parallel therewith, a combined film reel and magazine supported by said bracket and including a non-rotary hub mounted on said pin and provided with a projecting portion containing the film outlet, a concentric pan-shaped main part freely rotatable in a horizontal plane and means for rendering the feed magazine flame tight, a take-up bracket having a horizontal spindle, a combined film reel and magazine including a hub mounted on said spindle and rotatable therewith in a vertical plane, a non-rotary pan-shaped main part concentric with said spindle and hub and having a film inlet in its rim and means for rendering the take-up magazine flame tight, and means for transmitting motion to said spindle from said feed mechanism, substantially as hereinbefore specified.

CHARLES B. GILLESPIE.

Witnesses:
 A. A. WERNER,
 MYRTLE B. GILLESPIE.